(No Model.)

H. ALLEY.
BEE SWARMER.

No. 430,104. Patented June 17, 1890.

WITNESSES

INVENTOR
Henry Alley,

UNITED STATES PATENT OFFICE.

HENRY ALLEY, OF WENHAM, ASSIGNOR TO FRANCIS E. MERRIMAN, OF BOSTON, MASSACHUSETTS.

BEE-SWARMER.

SPECIFICATION forming part of Letters Patent No. 430,104, dated June 17, 1890.

Application filed January 13, 1890. Serial No. 336,799. (No model.)

*To all whom it may concern:*

Be it known that I, HENRY ALLEY, a citizen of the United States, residing at Wenham, in the county of Essex and State of Massachusetts, have invented certain new and useful Improvements in Bee-Swarmers; and I do hereby declare the following to be a full, clear, and exact description of the invention, such as will enable others skilled in the art to which it appertains to make and use the same.

Figure 1:
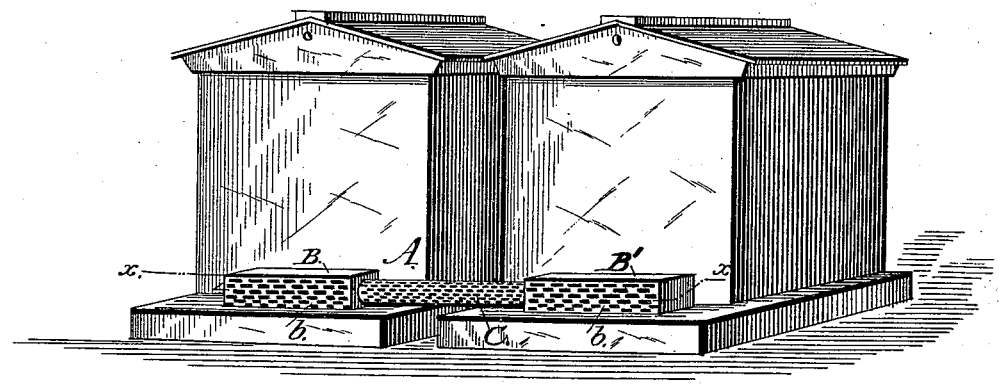
Figure 2:
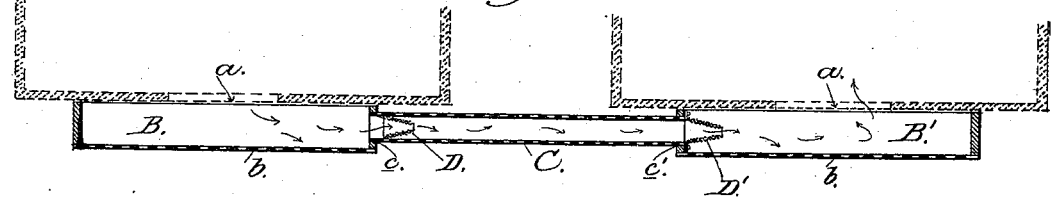
Figure 3:
Figure 4:
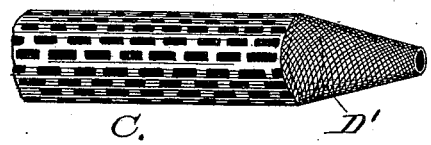

Figure 1 is a perspective view showing my invention used in connection with two hives. Fig. 2 is a horizontal sectional view on the line $x\,x$ of Fig. 1. Figs. 3 and 4 are details to be referred to.

My invention relates to devices used in apiculture for swarming bees in the hive; and it consists in the peculiar constructions, arrangements, and combinations of the several parts, as I shall hereinafter fully describe and claim.

To enable others skilled in the art to make and use my invention, I will now describe the same and indicate the manner in which the same is carried out.

Referring to the drawings, A represents my swarmer, composed of three essential parts—viz., two end portions or cages B and B' and an intermediate foraminated cylinder C, which I term a "conductor," uniting the two end cages and having a communication with each, said conductor being detachably and reversibly connected with the end cages in any suitable manner, so that it may be readily placed into position and when removed will occupy with the removable end cages but a small space either in storage or transportation.

To more minutely describe my invention, I will say that each end cage B B' consists of a three-sided box, adapted to have its open side placed in communication with the entrance-opening in a hive, as shown at $a$, while the front side or wall of said box is formed by a perforated plate $b$, whose foraminations may be of any shape and sufficiently large to permit the worker bees to pass through them into the open air. In one end of each of these cages B B' is formed an opening $c\,c'$, into which the opposite ends of the connecting tubular conductor C is removably fitted, this conductor having its ends pushed into the openings in the adjoining ends of the cages B B', while its entire surface is formed with elongated or other perforations, which insure the passage throughout the conductor being well lighted for the queen bee as she, in her efforts to escape, passes from the home hive into the adjacent cage, and not being able to pass therefrom to the open air she will pass through the opening $c$ in her efforts to find an egress, and will then pass along the tubular conductor to the opposite cage B' and finally into a second hive.

The perforations in the front walls of the cages B B', and those which are formed in the tubular conductor, while small enough to prevent the escape of the queen bee, permit the worker bees to pass in and out and to be led by the queen into the cage B', whose open side is adapted to communicate with the empty hive placed to receive the swarm.

To prevent the queen bee passing back into the home hive after she has entered the tubular conductor, or from passing back into the said conductor after she has entered the cage B', which communicates with the empty hive, I employ a plural number of cones D D', preferably made of wire-gauze or like material, and secure one of these cones D just inside of that end of the tubular conductor which communicates with the opening in the cage B, and so locate the cone that its apex or smaller end extends inwardly and is centrally placed. The opposite end of the tubular conductor may also be provided with a conical end, or with a wire-gauze cone, if desired, as shown in Figs. 3 and 4, in which case this conical end or cone will be passed into the opening $c'$ in the end of the cage B, and thus the tubular conductor is made removable and reversible, as either end may be fitted into the openings $c\,c'$ in the ends of the cages B B', and the empty hive may therefore be placed in any position with relation to the home hive and the bees will be directed into it. I may, however, prefer to use the construction shown in Fig. 2, in which instance the second cone D' is secured to the inner wall of the end of the cage B' with its larger end communicating with the opening c' therein, and its smaller end or apex projecting into the cage. In either case, however, the operation and results produced by these cones are the same—namely, that they prevent the queen bee from passing back into the tubular conductor or cage B after she has passed out of either into the next adjoining apartment.

In using my invention one of the cages is placed before the home hive, with its open side connecting with the entrance-opening in the hive, and the other cage similarly placed before an empty hive, and the tubular conductor placed in position between them, as before stated, the device being placed in position previous to the issue of the swarm. As the bees leave the home hive to escape to the open air, the queen bee finds her escape cut off by the smallness of the perforations in the front wall of the cage B, through which the worker bees are passing, and in seeking a means of escape she is instinctively drawn into the lighted chamber formed by the perforated conductor, passing first through the cone in the near end thereof. Finding that she cannot escape through the perforations in the conductor, and finding, also, that her escape backward into the cage B is cut off by this cone, she seeks other means of escape and finally finds an outlet through the second cone D' into the cage B', her peculiar "piping" calling to her the worker bees, which pass into the cage B'.

As the queen bee cannot escape from the cage B' because of the smallness of the perforations therein and the cone D', she instinctively passes into the empty hive through its entrance, which leads directly from the cage, and the worker bees follow her and swarm in the empty hive without further trouble to the apiarist.

By using this apparatus the escape of swarms can be guarded against, so that the bees do not need to be constantly watched during the swarming season.

Having thus described my invention, what I claim as new, and desire to secure by Letters Patent, is—

1. A bee-swarmer consisting of two separated cages having perforated front walls, open rear walls, and with openings formed centrally in their inner ends, a perforated tubular conductor joining said cages and having its opposite ends communicating with and detachably fitted to the openings in the inner ends of the cages, whereby said conductor may be reversed, and cones connected with the conductor having their apexes pointing in the same direction, substantially as herein described.

2. In a bee-swarmer, the combination of two separated cages having perforated front walls and open rear walls, the removable and reversible perforated tubular conductor having its opposite ends fitted to the cages, and cones connected with said conductor at or near opposite ends, with their apexes pointing in the direction of the line of passage of the queen bee, substantially as herein described.

In testimony whereof I affix my signature in presence of two witnesses.

HENRY ALLEY.

Witnesses:
  CLARENCE KIMBALL,
  HENRY ALLEY, Jr.